A. N. BAILEY.
BALL CASTER.
APPLICATION FILED MAY 5, 1910.
982,409.
Patented Jan. 24, 1911.
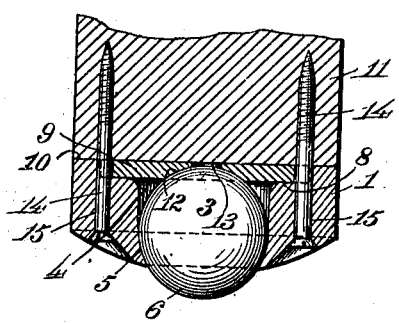
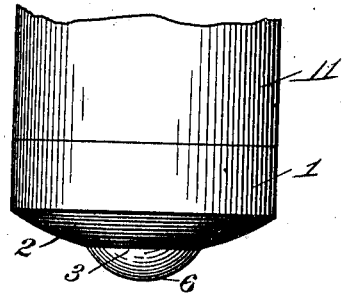
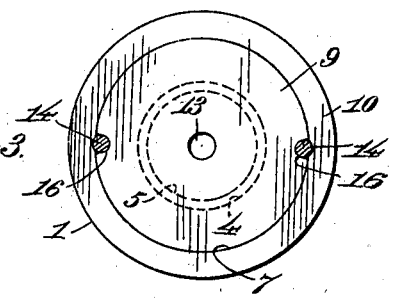
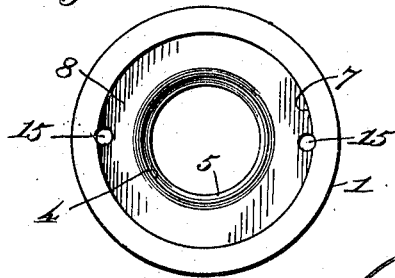
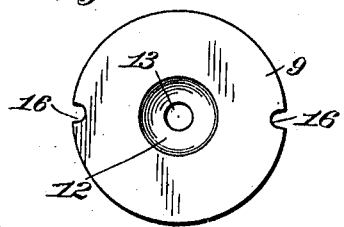
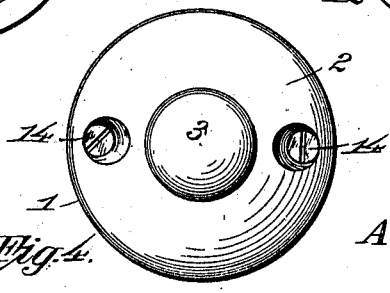
Witnesses
H. S. Austin
Inventor
Adam N. Bailey,
By Joshua R. H. Potts
Attorney

UNITED STATES PATENT OFFICE.

ADAM N. BAILEY, OF SCHUYLER, PENNSYLVANIA, ASSIGNOR OF ONE-HALF TO HARRY V. SMITH, OF SCHUYLER, PENNSYLVANIA.

BALL-CASTER.

982,409.

Specification of Letters Patent. Patented Jan. 24, 1911.

Application filed May 5, 1910. Serial No. 559,611.

*To all whom it may concern:*

Be it known that I, ADAM N. BAILEY, a citizen of the United States, residing at Schuyler, county of Northumberland, and State of Pennsylvania, have invented certain new and useful Improvements in Ball-Casters, of which the following is a specification.

My invention relates to casters and particularly to ball casters such as are adapted for use upon various articles of furniture.

The object of my invention is to provide an improved ball caster which shall be of simple construction, readily applied to the furniture and of neat appearance.

A further object of my invention is to provide an improved ball caster in which the ball shall not bind in the socket.

Other objects will appear hereinafter.

With these objects in view my invention consists generally in a socket member adapted to be secured to the furniture and having a cylindrical socket terminating in a spherical lower portion, a ball in said socket and projecting slightly beyond the lower portion of the socket member and a bearing or thrust member arranged in the upper end of the socket member. The bearing member comprises a disk arranged in a recess in the upper end of the socket member and provided with a spherical seat for the ball. The device is secured to the furniture by a plurality of screws extending vertically through the socket member into the furniture and the edges of the bearing member or disk are apertured or notched to receive the screws whereby the disk is prevented from rotating.

My invention further consists in various details of construction and arrangements of parts all as will be fully described hereinafter and particularly pointed out in the claim.

My invention will be more readily understood by reference to the accompanying drawings forming a part of this specification and in which—

Figure 1 is a vertical section through a caster embodying my invention in its preferred form, Fig. 2 is a side elevation of the same, Fig. 3 is a top plan view of the device, Fig. 4 is a bottom plan view, Fig. 5 is a top plan view of the socket member with the disk and ball removed, and Fig. 6 is a bottom plan view of the disk.

Referring now to the drawings 1 indicates the socket member which comprises the body of the device. This consists of a cylindrical member having a convex lower face 2. The member 1 is provided with a central vertical recess comprising a socket for the ball 3 and consisting of a cylindrical portion 4 and a lower spherical portion 5 which fits snugly a zone of the ball 3 below the horizontal center thereof, and permitting the ball 3 to project slightly below the socket member as at 6.

The upper end of the member 1 is provided with a circular recess 7 of greater diameter than the cylindrical portion 4 of the socket and having a flat horizontal bottom 8 forming an annular seat for the disk or bearing member 9. The recess 7 is of substantially the same depth as the thickness of the disk 9, bringing the upper face of said disk and the annular upper edge 10 of the member 1 into the same plane, forming a flat seat for the leg 11 of the furniture. The under face of the disk 9 is formed with a cylindrical recess or bearing surface 12 for the ball and is preferably provided with a central perforation 13 to reduce the size of the bearing surface. The parts are so proportioned that by resting the disk 9 on the surface 8 there is no tendency to bind the ball between the surfaces 5 and 12 of the socket.

The device is secured to the furniture by a plurality of screws 14, two usually being sufficient. The screws 14 extend through vertically disposed screw holes 15 formed in the outer portion of the member 1, and the disk 9 is notched or recessed as at 16 for the screws, by which construction rotation of the disk 9 is prevented, otherwise rotation of the disk would tend to bind the ball 3 on the seat 12 unless the surfaces 12 and 5 were ground with great accuracy and the disk and its recess 7 as accurately centered with relation to the socket.

Having described my invention what I claim as new and desire to secure by Letters Patent is:

A caster comprising a ball and a socket member, said socket member having a vertical cylindrical socket of the same diameter as that of the ball and terminating at its lower end in a spherical portion, said ball fitting in said socket and projecting beyond the lower end of said member, said socket member being provided at its upper end with a shallow circular recess of greater diameter than the cylindrical portion of the socket, a disk arranged in said recess and having a spherical bearing surface on its under face for said ball, and a plurality of attaching screws extending through said socket member and said disk, the edges of the disk being apertured to receive said screws, substantially as described.

In testimony whereof I have signed my name to this specification in the presence of two subscribing witnesses.

ADAM N. BAILEY.

Witnesses:
ISAAC L. ACOR,
H. V. SMITH.